(12) United States Patent
Hodge

(10) Patent No.: US 7,376,216 B2
(45) Date of Patent: May 20, 2008

(54) FREIGHT CONTAINER INSPECTION SYSTEM

(76) Inventor: William E. Hodge, #401-2160 Cornwall Avenue, Vancouver, BC (CA) V6K 1B4

( * ) Notice: Subject to any disclaimer, the term of this patent is extended or adjusted under 35 U.S.C. 154(b) by 0 days.

(21) Appl. No.: 10/328,382

(22) Filed: Dec. 24, 2002

(65) Prior Publication Data

US 2003/0152193 A1    Aug. 14, 2003

Related U.S. Application Data

(60) Provisional application No. 60/356,641, filed on Feb. 13, 2002.

(51) Int. Cl.
*G01N 23/04* (2006.01)
(52) U.S. Cl. .................... 378/57; 250/358.1
(58) Field of Classification Search ............... 378/57; 250/358.1
See application file for complete search history.

(56) References Cited

U.S. PATENT DOCUMENTS

| | | | | |
|---|---|---|---|---|
| 3,741,504 A | * | 6/1973 | Alberti et al. ........... | 244/137.1 |
| 3,966,075 A | * | 6/1976 | Schultz ..................... | 220/1.5 |
| 4,875,814 A | * | 10/1989 | Weller ...................... | 410/66 |
| 5,600,303 A | * | 2/1997 | Husseiny et al. ......... | 378/57 |
| 5,754,617 A | * | 5/1998 | Itoh ........................... | 378/57 |
| 5,838,759 A | * | 11/1998 | Armistead ................. | 378/57 |
| 5,857,721 A | * | 1/1999 | Liroff ....................... | 292/307 R |
| 6,406,249 B1 | * | 6/2002 | McAdams et al. ........ | 414/800 |
| 2002/0100740 A1 | * | 8/2002 | Amoss ...................... | 212/224 |

* cited by examiner

*Primary Examiner*—Chih-Cheng G. Kao
(74) *Attorney, Agent, or Firm*—C. Larry Kyle; Nexus Law Group LLP

(57) ABSTRACT

A method and associated apparatus are given for the efficient and effective thorough inspection and remote examination of the contents of metal container cargo. This involves the use of a non-metallic box which fits inside a normal freight container and with securable doors to allow normal packing and removal of cargo. An attached handle would facilitate its withdrawal onto a platform during examination and for subsequent re-insertion into the metal container. An associated yoke containing an array of sensing devices and observation instruments is positioned at the platform to determine the contents non-invasively.

4 Claims, 2 Drawing Sheets

FREIGHT CONTAINER INSPECTION SYSTEM

CROSS-REFERENCE TO RELATED APPLICATIONS

This application claims priority under 35 U.S.C 119(e) to U.S. Provisional Patent application No. 60/356,641 filed Feb. 13, 2002, the disclousure of which is incorporated herein by reference.

BACKGROUND OF THE INVENTION

1. Field of Invention

This invention relates to a method and apparatus for generally facilitating and improving the ability to inspect the contents of the conventional containers used to transport cargo by trucks or ships. It is intended to provide customs, security, and immigration personnel with the means to ascertain the complete contents of all shipments entering their jurisdiction in a short period of time and without disturbing the cargo.

2. Description of Related Art

Current practice limits inspecting of what enters a port to about 1% or 2% of the total number of containers arriving from foreign countries. This partial inspection is a practical necessity imposed because of the difficulty and time involved in unloading the container contents for viewing, and subsequently replacing them again.

In some cases remote sensing devices are deployed from outside the metal container in an attempt to detect some potentially threatening contents.

SUMMARY OF THE INVENTION

Disclosure of the Invention

The novelty of the invention is a method whereby a fully enclosed drawer-type insert is housed within the standard container which can be fully exposed quickly to inspect and examine the entire contents of the container without disturbing the cargo or exposing it to contamination or pilfering. This security compartment is constructed of sensor-transparent material, that is, material such as structural plastic which is transparent to the particular sensing devices used. It is provided with full doors at the trailing end to give unhindered access for normal loading and unloading cargo.

The apparatus consists of two elements directed at effectiveness: the secured enclosure or security compartment which fits snugly inside the metal containers; and, the scanning yoke which enables the thorough inspection to be carried out by various sensor devices, the output from which is recorded for subsequent examination. A third element of apparatus is directed at efficiency and consists of the mechanisms required to pull the drawer out of the container, pass it through the sensor yoke, and then push it back again into the container. An alternative configuration where the sensors can be inserted between the container and the compartment insert does not require the withdrawal mechanisms.

One feasible configuration of the apparatus is depicted in FIGS. 1 and 2 where the sequence of the operation is shown. The inspection procedure is somewhat similar to conventional highway truck scales checking and the apparatus could be advantageously installed at these existing stations, or at a similar convenient site.

OBJECTS AND ADVANTAGES

To fully address and remove the shortcomings of current inspection systems which suffer from the following constraints on performance:

The sampling of contents of metal containers means that now about 98 out of every 100 of these hidden volumes, which in all cases is sufficient space to contain the means of unlimited civil or military damage, go unchecked.

When containers are thoroughly checked by opening and unloading the cargo, there is considerable delay and risk of loss or damage to the contents.

Because 98% or 99% of all freight crossing a border routinely goes uninspected there is a high probability that virtually anything can enter a country unbeknownst to the authorities. The present situation is therefore susceptible to abuse by criminal or terrorist elements.

BRIEF DESCRIPTION OF THE DRAWINGS

Aspects of the invention are illustrated, merely by way of example, in the accompanying drawings in which.

Figure 1:
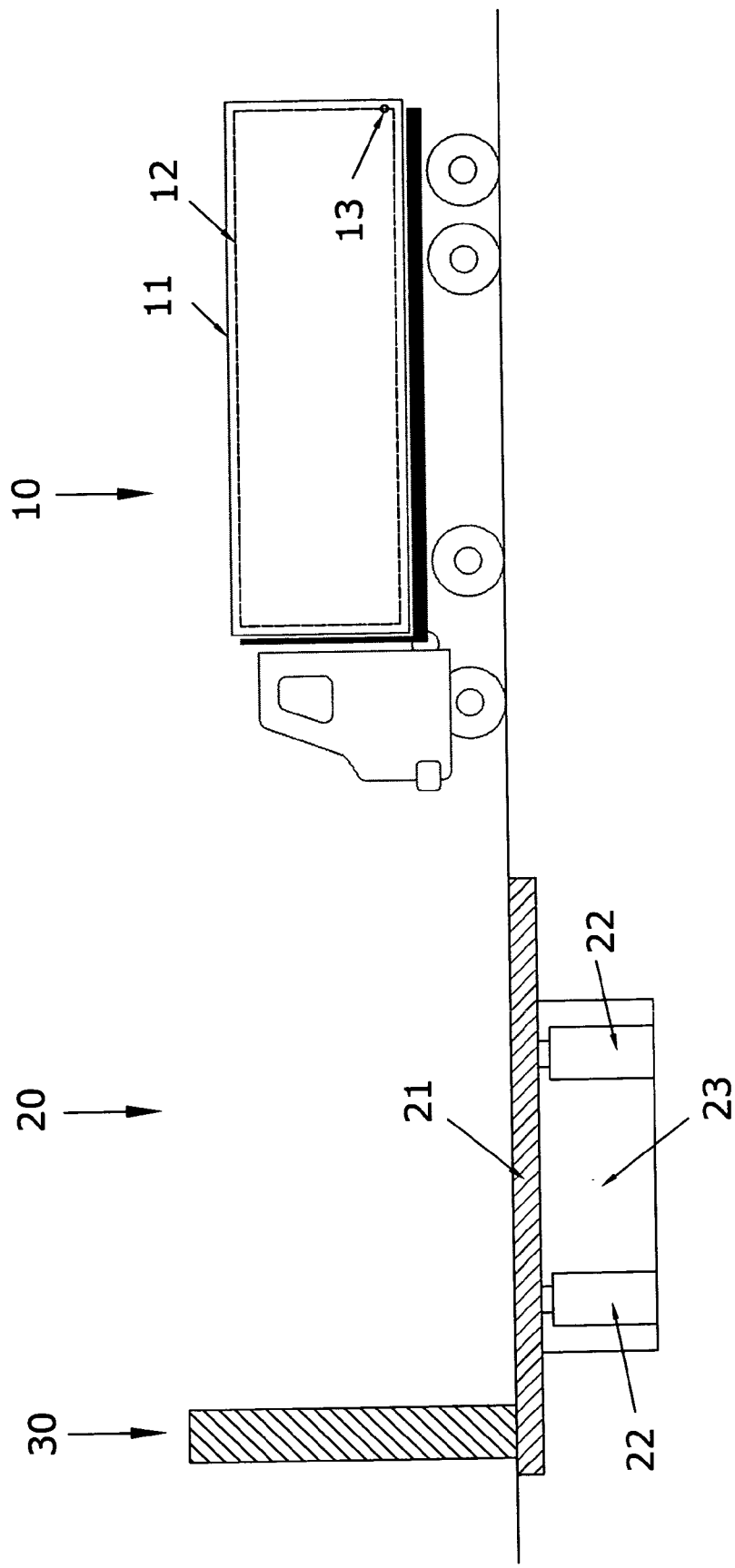
FIG. 1 is an elevation view of a preferred embodiment of the apparatus of the invention showing the configuration prior to the arrival of a truck-borne container. The sensor yoke is fixed in place at the inspection site. The platform is retracted to be aligned with ground level.

| List of Reference Numerals | |
|---|---|
| 10 | typical tractor-trailer, or truck |
| 11 | typical metal container |
| 12 | security compartment/secured enclosure |
| 13 | withdrawal/replacement handle |
| 20 | inspection site |
| 21 | inspection platform |
| 22 | platform elevator |
| 23 | platform basement |
| 30 | sensor yoke |

As will be obvious from these drawings, the procedure and apparatus would be less complicated for the case where a truck was required to back up to a fixed platform. The option to construct/assemble a mobile version of the apparatus entails no added novelty, and is another obvious embodiment of this invention. Where the space between the security compartment and the container was large enough to insert the scanner array without the need to remove the security compartment from the container, the platform could be reduced to a minimum, or dispensed with entirely.

DESCRIPTION OF A PREFERRED EMBODIMENTS

Description of the Device

FIG. 1 shows a truck-borne container 10 approaching an inspection site 20 where an array of non-invasive sensors 30 are deployed/positioned.

The typical metal container 11 carries its entire cargo within the inserted security compartment 12. Security compartment 12 is fitted with handle 13 to facilitate pulling 12 out of 11 and then pushing it back again.

Platform 21 is in the retracted position as the transport 10 approaches to pass the sensor array 30. Elevator jacks 22 are housed within the platform basement 23 to maintain clear passage of transport 10.

Figure 2:
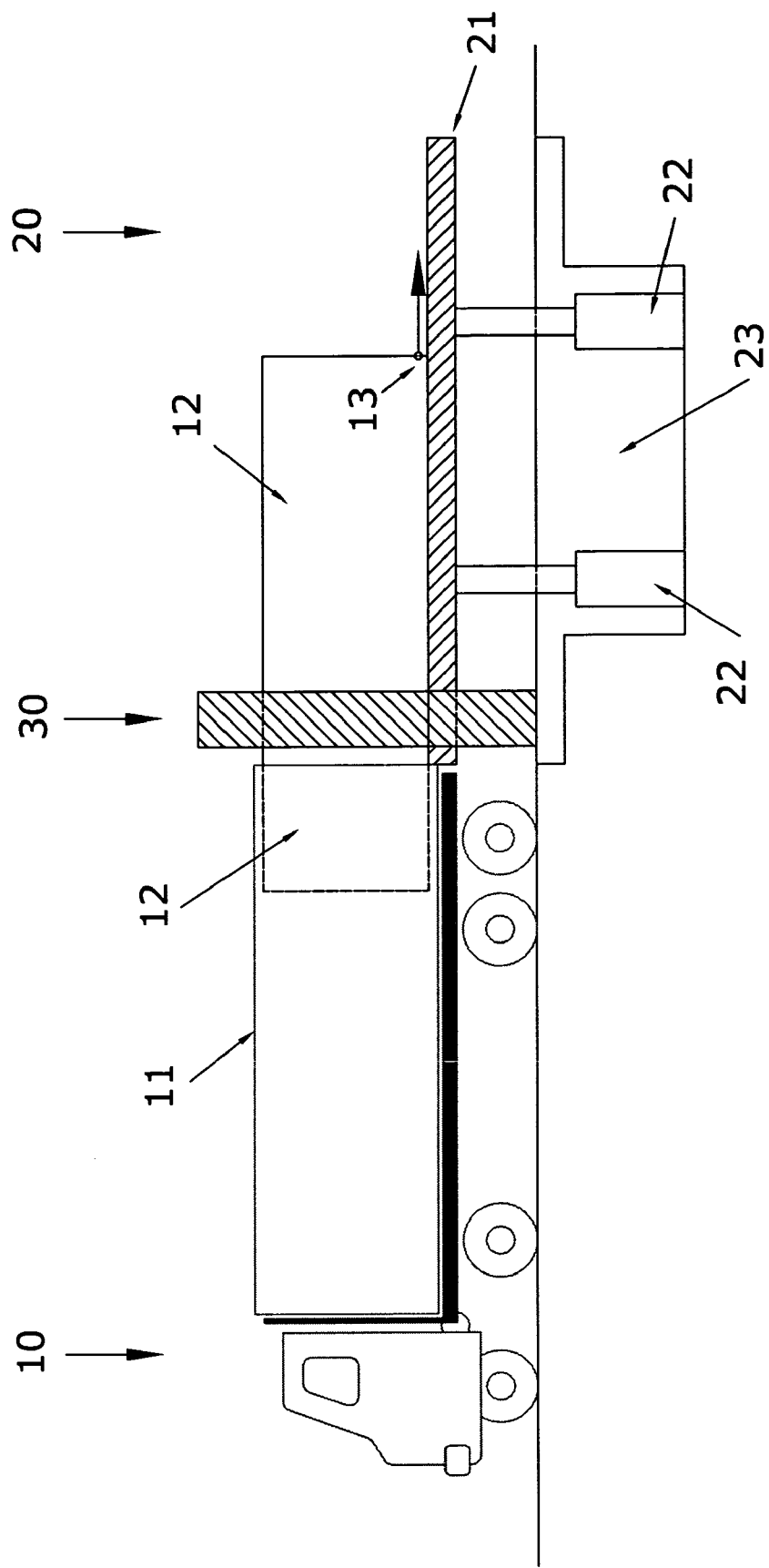
FIG. 2 is an elevation view of a preferred embodiment of the apparatus of the invention showing the configuration during the examination of a truck-borne container. The back door of the container is somewhat past the sensor yoke and the platform has been raised to align with the floor of the container. The inner security compartment is shown partially withdrawn from, or replaced within, the container.

FIG. 2 shows the transport 10 positioned beyond 30 for inspection. Platform 21 has been elevated to the bottom level of 11 using elevators 22. Handle 13 is used to slid 12 through sensor array 30 and onto platform 21 for temporary support. Handle 13 is then used to push 12 back into metal container 11 to allow the transport 10 to proceed.

OPERATION OF INVENTION

For the sake of clarity the operation of the system is described for the case of a container hauled by a conventional tractor-trailer for highway transport. The adaptions for containers offloaded from a ship at port are essentially the same except that the container would be placed on the platform by crane or similar freight-movement equipment.

In order to improve the examination of the contents of a container, the truck would drive over the platform and under the sensor yoke, similar to how a truck is dealt with at a conventional highway weigh scales. The truck would come to a stop when it had passed the platform and its tail-gate was in line with sensor yoke. While passing under the yoke the sensors would establish the dimensions and orientation of the container and program the drive motors in the platform's hydraulics to respond to those dimensions with respect to the efficient withdrawal of the insert.

The platform would be elevated to become aligned with the base of the insert both vertically and horizontally. Fasteners would be attached to the withdrawal handles automatically, those having been recognized by the sensors, and the rear doors of the container having been opened prior to passing under the yoke. Using conventional hydraulic or mechanical powered tools/equipment, such as double-acting rams or cables and blocks, the security compartment would be withdrawn from the container so that it passed entirely through the sensor yoke and onto the aligned platform. While on the platform it would be weighed. Its length would be measured while passing under the yoke to ensure the full space within the container was accounted for.

The yoke would contain an array of state-of-art remote, non-intrusive, scanning detectors capable of finding any deleterious or contraband materials or indications of biological activity, and deployed so as to cover the full cross section of the security compartment insert.

The security compartment would be returned to its original place within the container using the withdrawal mechanism in reverse. The rear doors of the container would be locked and secured with an electronically encoded message inscribed by the inspection agency. This message would be contaminated if the lock were to be subsequently opened by an unauthorized person.

Identification of the cargo would be based of the records made by the remote sensors housed within the yoke, and would be the basis for subsequent approval or denial of entry by authorities at the port of entry who would receive these data electronically prior to the approach of the truck and its container. The scheduled port of entry might, upon receipt of the inspection station report, decide to intercept the cargo prior to arrival. Interception points would be sited in low density inhabited location, away from the inspection stations to avoid confrontation with their civilian staff.

While specific embodiments of the invention have been described and illustrated, such embodiments should be considered illustrative of the invention only, and not as limiting the invention as construed in accordance with the accompanying claims.

I claim:

1. A method to reduce a risk of terrorists or criminals using cargo space of metal freight containers to convey people, material, or contraband across security borders undetected, including the steps of:
   providing a metal container with a single drawer-like, inner sensor-transparent security compartment sized to occupy all accessible space inside the metal container;
   placing cargo only inside said security compartment
   inserting said security compartment fully into said container;
   transporting said container to an inspection station having a sensor array and a hydraulic platform;
   passing said container through said sensor array until said container is positioned adjacent thereto, said sensor array scanning said container to determine the dimensions and orientation of said container;
   positioning said hydraulic platform in response to said dimensions and orientation of said container such that said platform is aligned with the level of the base of said security compartment;
   withdrawing said security compartment from said metal container through said sensor array onto said hydraulic platform, said security compartment being withdrawn until fully withdrawn from said metal container and through said sensor array;
   scanning said security compartment while it passes through said sensor array to examine said cargo;
   reinserting said security compartment into said container.

2. The method of claim 1, further comprising the steps of:
   locking said security compartment within said container;
   securing said container with an electronically encoded message inscribed by said inspection station identifying said cargo based on the scanning results from said sensor array, said electronically encoded message becoming contaminated from unauthorized entry into said container.

3. The method of claim 2, further comprising the step of electronically forwarding said electronically encoded message to authorities at a point of entry for said container.

4. The method of claim 1 wherein said security compartment being weighed while positioned on said hydraulic platform.

* * * * *